Patented July 13, 1937

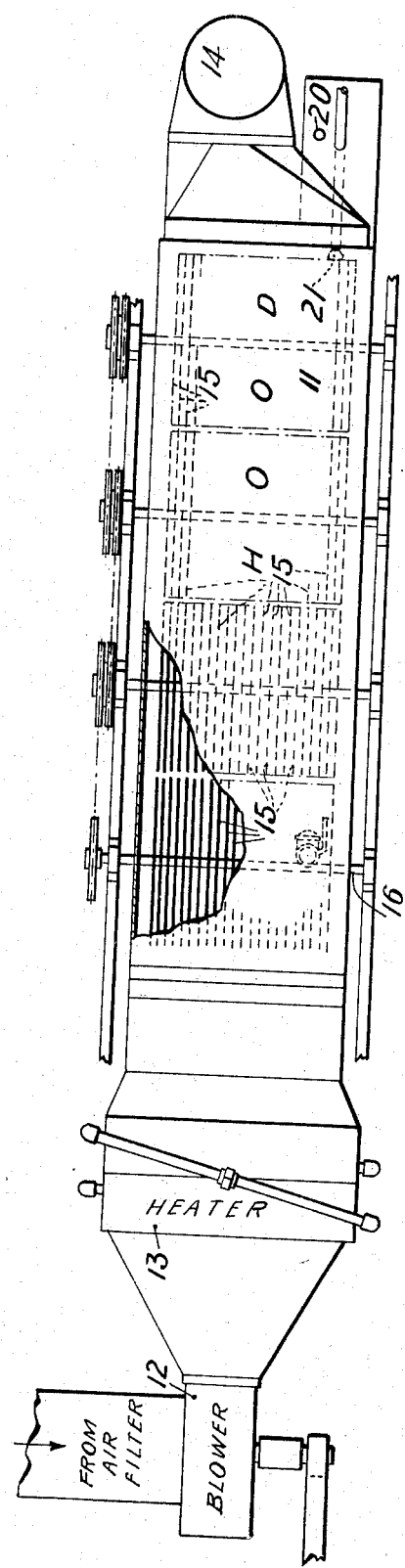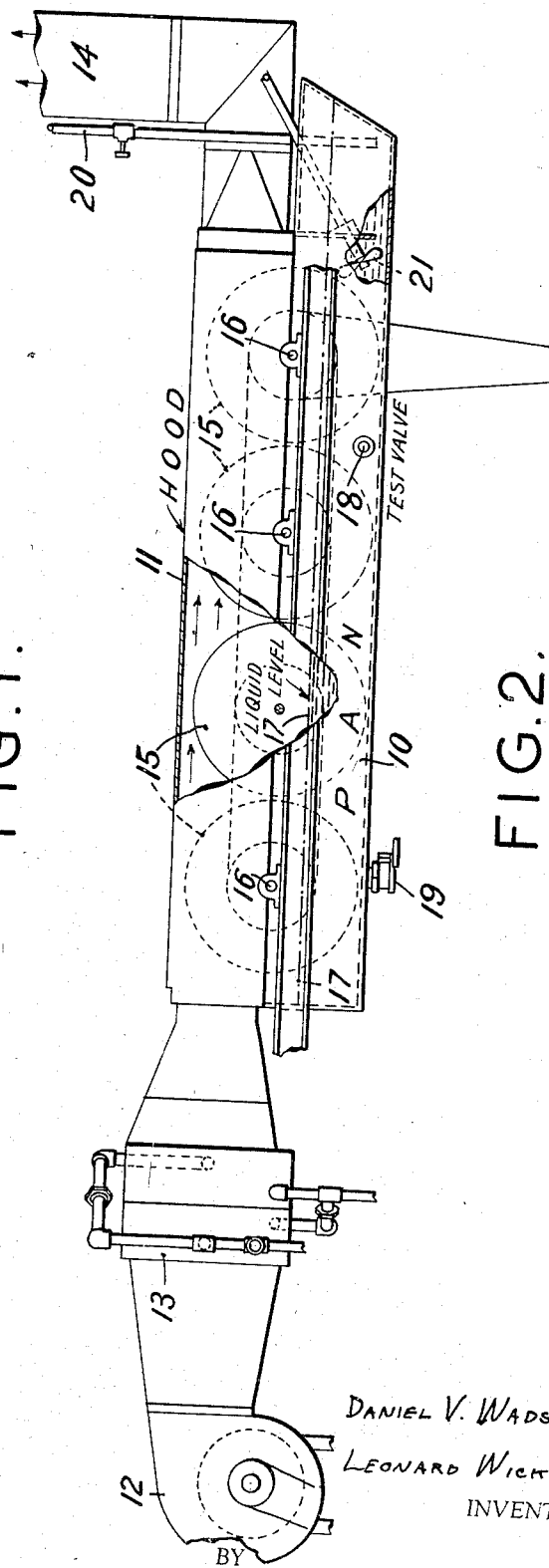

2,087,077

UNITED STATES PATENT OFFICE 2,087,077

PROCESS OF PRODUCING INTENSIFIED JUICES

Daniel V. Wadsworth and Leonard Wickenden, Manhasset, N. Y.

Application September 24, 1935, Serial No. 41,846

9 Claims. (Cl. 99—142)

This invention relates to intensified fruit juice of a kind suitable for flavoring foods such as ice cream, jellies, soda fountain drinks, etc., as well as for general use where a fruit flavor is desired. The invention also relates to other fruit products, such as jams and preserves.

A particular object of the invention is to provide a fruit flavor with excellent keeping qualities which will retain the full taste and flavor of the fresh fruit, and which is produced without boiling or freezing.

The invention produces a concentrated or intensified fruit syrup that contains substantially all of the flavoring elements originally contained in from two to seventeen times its volume of the fresh fruit product. This concentrated product can be economically prepared at plants located in the fruit-growing regions, and it can then be shipped to points of consumption at much lower cost than could the original fruits themselves, due to its concentrated form and to the fact that refrigeration is unnecessary.

In carrying out the method of the invention the density of the natural fruit juice is first increased, by the addition of a soluble substance, to a point where the juice contains at least 50% by weight of dissolved solids, and water is then evaporated from the juice without boiling and without heating the juice above the temperature of flavor deterioration.

The present application is in part a continuation of prior applications Serial No. 564,710, filed September 23, 1931; Serial No. 647,412, filed December 15, 1932, and Serial No. 749,819, filed October 24, 1934.

While preferred forms of the invention are disclosed herein, various changes may be made without departing from the spirit of the invention as herein set forth and claimed.

In the drawing:

Fig. 1 is a diagrammatic plan view of an apparatus for carrying out the process of the invention.

Fig. 2 is a diagrammatic side elevation of the apparatus of Fig. 1.

We have found that as a general rule the keeping qualities of a fruit syrup depend upon the osmotic pressure exerted by the molecules in solution. In applying this principle we have found that in order to retain all of the fruit flavor unimpaired and to protect against spoilage, the syrup should contain about 75%, by weight, of dissolved solids.

These solids are preferably the sugars and other soluble solids that are naturally found in the fruit juice, and our invention provides a method for concentrating fresh fruit juice to the required density while preserving the delicate ethers, esters, and other constituents of the fruit flavors.

In carrying out the process the density of the fresh fruit juice is first increased with some substance that will dissolve in the juice. This substance is added in sufficient quantity to raise the density of the juice to a point where it contains approximately 50% to 75% of dissolved solids.

We prefer to increase the density of the fresh fruit juice by adding sugar until the juice becomes a syrup of the required density. Usually the sugar is added in the form of a partially inverted syrup, containing about 50% of the polysaccharide sucrose and about 50% of the monosaccharide inverted sugars dextrose and levulose. This syrup is convenient to use, since it maintains its consistency; it dissolves in the fruit quice without requiring heat; and the intensified syrup that results from the first several batches when made by the preferred process disclosed below, will have the required density without having excessive sweetness or a tendency to crystallize.

The purpose of first increasing the density of the juice is to retain the flavor unimpaired and to prevent fermentation or deterioration of the juice during the subsequent step of evaporating the water from the juice. The preliminary formation of a heavy syrup checks oxidation or enzymic action, and avoids foaming or the formation of a scum.

After the starting syrup has been formed, water is evaporated from it by means of a current of warm air. As the evaporation proceeds fresh juice is added, either intermittently or continuously, until the desired amount of fresh juice has been added. The evaporation is then continued without the addition of fresh juice until the density is raised to the point where the syrup contains about 75% of dissolved solids.

A preferred apparatus for carrying out the process is shown in the drawing, in which the reference numeral 10 indicates the pan for containing the syrup. A hood 11 covers the pan, and air is forced by the blower 12 through heater 13, and through the hood, whence it escapes by way of stack 14.

A plurality of discs 15 are mounted on each of the shafts 16. Since these discs rotate with their lower portions submerged in the syrup each one carries up into the air stream a film of the syrup, thereby aiding the evaporation. The discs also serve to slowly stir the syrup without beating air into it.

The average level of the syrup in pan 10 during the evaporation step is indicated by the dotted line 17. A thermometer is exposed in the pan to enable the attendant to check the temperature of the syrup.

In order to carry on the evaporation in an efficient manner the air flow through the hood should be as rapid as possible without entrainment of the syrup, i. e., without carrying any drops of the syrup over to the stack.

The rate of evaporation is also dependent on the differential between the temperature of the syrup and the temperature of the air. This differential should be as great as possible within economical limits and without heating the syrup above the temperature at which the fruit flavor deteriorates. This "temperature of deterioration" differs with the various fruits. For the citrus fruits it is comparatively low, about 80° F.; for grape it is about 90° F.; while cherry is able to stand much higher temperatures, at least 120° F. If the different fruit syrups are heated above their respective "temperatures of deterioration" they acquire a cooked flavor, which is entirely absent if they are kept below this critical temperature. The "temperature of deterioration" for any particular juice can easily be ascertained by trial.

In the preferred apparatus the hood 11 is heat-insulated, while the pan 10 is not, with the result that the surrounding air tends to cool the syrup in the pan. The rapid evaporation of the syrup which occurs from the films carried by the discs also helps to cool the syrup, these two factors making it possible to keep the temperature of the syrup below 90° F. while operating with an air stream at 170° F. In some cases, however, as in the case of pineapple juice or orange juice, the treatment of which occurs in tropical or semi-tropical countries, it may be advantageous to cool the pan by means of a water jacket.

Example

By way of example the process will be explained in detail as applied to orange juice, the composition of which is approximately as follows:

|   | Per cent |
|---|---|
| Total sugars | 10.1 |
| Acid | 1.3 |
| Ash | 0.4 |
| Other non-sugar solids | 0.7 |
| Total dissolved solids | 12.5 |
| Water | 87.5 |
|   | 100.0 |

To start the process the fresh orange juice first has its density increased by the addition of the partially inverted syrup described above until it contains a total of approximately 65% of dissolved solids. A syrup of this density preserves the fruit flavor during evaporation, as previously mentioned, and is of good consistency for handling in the apparatus.

One hundred and twenty-five gallons of this starting syrup is run into the pan through inlet pipe 20 and the apparatus is then started. The air current is kept at a temperature between 160° and 165° F., while the syrup is not permitted to rise above 80° F.

As the water evaporates from the syrup the attendant permits fresh juice to enter the pan through pipe 20 so as to maintain the syrup at about the starting density at all times during the process. He checks the density at intervals by drawing off some of the syrup through the test valve 18. The agitator 21 mixes the thin fresh juice with the heavier syrup already in the pan.

Before starting the process it is ascertained by calculation that if the orange juice is to be concentrated to a density at which it contains approximately 75% of dissolved solids, it will be necessary to reduce the volume of 800 gallons of the fresh juice to 100 gallons, an 8 to 1 concentration. The attendant therefore adds fresh juice to the syrup in the pan until he has added 800 gallons. He then permits evaporation to proceed until the syrup contains about 75% of dissolved solids, at which point he will have a volume of approximately 200 gallons of syrup in the pan. The finished bath is then discharged through valve 19.

The finished intensified orange syrup will contain unchanged all of the constituents, including the flavoring constituents, of 8 times its volume of fresh orange juice, and it will retain that flavor indefinitely without refrigeration. The total solids in this first batch will include a higher percentage of sugars than are found in fresh orange juice, but due to the fact that they are present partly in the form of the polysaccharide sucrose and partly in the form of the invert sugars dextrose and levulose, there will be no tendency to crystallize at ordinary temperatures, nor will there be any excessive sweetness.

In starting the next batch, it is best to take part of the previous batch of finished product, thereby avoiding the necessity of forming a starting syrup by adding sugar to fresh juice. In this way the percentage of added sugar becomes less with each successive batch, until finally it is negligible, and the dissolved solids of the intensified syrup are present in exactly the same proportions as in the fresh juice.

When using previously intensified orange juice as a starting syrup it is first diluted with fresh orange juice to a density of about 65% dissolved solids.

Having thus explained the application of the process to orange juice, we will now consider some of the broader aspects of the invention.

It should be evident from the above that the purpose of first increasing the density of the juice is to prevent deterioration of the flavor during the evaporation step. Any substance can be utilized that will dissolve in the juice and raise the molecular concentration of the juice to the desired point provided its presence is not objectionable. Any other soluble polysaccharide sugars such as maltose, lactose, or raffinose, can be substituted for the polysaccharide sucrose and other soluble monosaccharide sugars such as fructose, glucose, or galactose can be substituted for the monosaccharides dextrose and levulose. Even salt could be used provided the first batches are diverted to some purpose other than food use. The salt would disappear by gradual dilution in successive batches. When the term "starting syrup" is used herein reference is made to juice having its density raised with any suitable medium.

For the sake of brevity the invention has been described as being applied to fruit juices, but obviously is applicable to the juices of fruits, berries, pineapples, melons, or any other watery liquids which contain delicate flavors that must be preserved during the concentrating process.

The process preserves other delicate constituents found in fruit and vegetable juices, such as the vitamines, which are destroyed under excessive heat. By starting with a vegetable juice, such as carrot juice, and keeping the juice below the "deterioration temperature" of the vitamines, a satisfactory vitamine concentrate can be produced.

It is preferred to have the finished product in the form of a heavy syrup that can be poured and pumped, and it is for this reason that the density is not raised above approximately 75% of dissolved solids. However, some juices such as loganberry, contain a high percentage of pectin, and upon standing after concentration undergo a certain amount of jelling. Different juices contain varying amounts of pectin, so that the intensified juices ultimately have different consistencies varying from a heavy syrup to a jelly.

The best product results when the density of about 75% of dissolved solids in the finished syrup is composed of the dissolved solids of the fresh juice. Since different fresh juices contain different percentages of dissolved solids, this means that the ratio of concentration will vary with different juices.

We have already seen that orange juice with 12.5% dissolved solids has a concentration ratio of 8:1 by volume. For some other juices the ratios are as follows:

| Juice | Dissolved solids in the fresh juice | Concentration ratio by volume |
|---|---|---|
| | Percent | |
| Grape | 18.5 | 5¼:1 |
| Strawberry | 6 | 17½:1 |

It will be understood by those skilled in the art that the percentages given herein, for the densities of the different syrups at starting, during the process, and in the finished intensified syrup, are stated for ordinary room temperature (approximately 70° F.), and that they may be lowered somewhat with a corresponding sacrifice in flavor and keeping qualities.

The term "intensified juice" as used herein means a concentrate formed from fresh juice without freezing or boiling, and containing substantially everything of the original juice except the water.

We claim:

1. The process of producing intensified juice without boiling and without heating the juice above the deterioration point, which comprises, first forming a starting syrup containing fresh juice and having a concentration of above approximately 50% of dissolved solids, evaporating water from the syrup, without boiling the syrup, to raise its density, replacing the evaporated water with additional fresh juice, continuing evaporation and addition of fresh juice while maintaining the density of the syrup at all times between approximately 50% and 75% dissolved solids, and stopping the evaporation when the syrup has a density of approximately 75% of dissolved solids.

2. The process of producing intensified juice without boiling and without heating the juice above the deterioration point, which comprises, first forming a starting syrup by adding sugar to the fresh juice to form a syrup having a concentration of above approximately 50% of dissolved solids, evaporating water from the syrup, without boiling the syrup, to raise its density, replacing the evaporated water with additional fresh juice, continuing evaporation and addition of fresh juice while maintaining the density of the syrup at all times between approximately 50% and 75% dissolved solids, and stopping the evaporation when the syrup has a density of approximately 75% of dissolved solids.

3. The process of producing intensified juice without boiling and without heating the juice above the deterioration point, which comprises, first forming a starting syrup by adding to the fresh juice a partially inverted sugar syrup containing 50% sucrose and 50% dextrose and levulose to form a syrup having a concentration of above approximately 50% of dissolved solids, evaporating water from the syrup, without boiling the syrup, to raise its density, replacing the evaporated water with additional fresh juice, continuing evaporation and addition of fresh juice while maintaining the density of the syrup at all times between approximately 50% and 75% dissolved solids, and stopping the evaporation when the syrup has a density of approximately 75% of dissolved solids, thereby producing an intensified juice containing substantial amounts of monosaccharide sugar and of polysaccharide sugar.

4. The process of producing intensified fruit juice without boiling and without heating the juice above the temperature of flavor deterioration which comprises, first forming a starting syrup containing fresh fruit juice and having a concentration of approximately 65% of dissolved solids, evaporating water from the syrup by passing over it a current of heated air, without boiling the syrup, to raise its density, replacing the evaporated water with additional fresh fruit juice, continuing evaporation and addition of fresh fruit juice while maintaining the density of the syrup at all times between approximately 65% and 75% dissolved solids, and stopping the evaporation when the syrup contains enough of the dissolved solids of the fresh juice to raise the density to approximately 75% of dissolved solids.

5. The process of producing intensified fruit juice without boiling and without heating the juice above the temperature of flavor deterioration which comprises, first forming a starting syrup by adding to the fresh fruit juice a partially inverted sugar syrup containing 50% sucrose and 50% dextrose and levulose to form a syrup having a concentration of approximately 65% of dissolved solids, evaporating water from the syrup, without boiling the syrup, to raise its density, replacing the evaporated water with additional fresh fruit juice, continuing evaporation and addition of fresh fruit juice while maintaining the density of the syrup at all times between approximately 65% and 75% dissolved solids, and stopping the evaporation when the syrup contains enough of the dissolved solids of the fresh juice to raise the density to approximately 75% of dissolved solids, thereby producing an intensified juice containing substantial amounts of monosaccharide sugar and of polysaccharide sugar.

6. The process of producing intensified fruit juice without boiling and without heating the juice above the temperature of flavor deterioration which comprises, starting with a syrup having a concentration of at least approximately 50% of dissolved solids, evaporating water from the syrup, without boiling the syrup, to raise its density, replacing the evaporated water with additional fresh juice, continuing evaporation and addition of fresh juice while maintaining the density of the syrup at all times between approximately 50% and 75% dissolved solids, and stopping the evaporation when the syrup has a density of approximately 75% of dissolved solids.

7. The process of producing intensified fruit juice without boiling and without heating the juice above the temperature of flavor deterioration which comprises, starting with a syrup having a concentration of approximately 65% of dissolved solids, evaporating water from the syrup, without boiling the syrup, to raise its density, replacing the evaporated water with additional fresh fruit juice, continuing evaporation and addition of fresh fruit juice while maintaining the density of the syrup at all times between approximately 65% and 75% dissolved solids, and stopping the evaporation when the syrup contains enough of the dissolved solids of the fresh juice to raise the density to approximately 75% of dissolved solids.

8. The process of producing a fresh fruit product which comprises forming a syrup containing a fresh fruit product and at least one monosaccharide sugar and at least one polysaccharide sugar, and evaporating water from the syrup to produce a syrup containing approximately 75% of dissolved solids at room temperature.

9. The process of producing a fruit product without boiling which comprises forming a syrup by adding to a fresh fruit product a partially inverted syrup rich in levulose and containing sucrose, and evaporating water from the syrup to yield a syrup containing approximately 75% of dissolved solids at room temperature.

DANIEL V. WADSWORTH.
LEONARD WICKENDEN.